(12) United States Patent
Dinel et al.

(10) Patent No.: US 11,987,348 B2
(45) Date of Patent: May 21, 2024

(54) AIRCRAFT HAVING A HYBRID POWER SOURCE WITH POWER GENERATION SOURCES CONTROLLED ACCORDING TO DRIVE UNIT POWER REQUIREMENTS

(71) Applicant: ASCENDANCE FLIGHT TECHNOLOGIES, Toulouse (FR)

(72) Inventors: Clément Dinel, Toulouse (FR); Benoît Ferran, Toulouse (FR)

(73) Assignee: ASCENDANCE FLIGHT TECHNOLOGIES, Toulouse (FR)

( * ) Notice: Subject to any disclaimer, the term of this patent is extended or adjusted under 35 U.S.C. 154(b) by 0 days.

(21) Appl. No.: 18/218,558

(22) PCT Filed: Jan. 4, 2022

(86) PCT No.: PCT/FR2022/050014
§ 371 (c)(1),
(2) Date: Jul. 5, 2023

(87) PCT Pub. No.: WO2022/148926
PCT Pub. Date: Jul. 14, 2022

(65) Prior Publication Data
US 2023/0399099 A1    Dec. 14, 2023

(30) Foreign Application Priority Data
Jan. 6, 2021   (FR) ...................................... 2100099

(51) Int. Cl.
*B64C 29/00*     (2006.01)
*B64D 27/02*     (2006.01)
(Continued)

(52) U.S. Cl.
CPC .......... *B64C 29/0008* (2013.01); *B64D 27/24* (2013.01); *H02J 1/086* (2020.01);
(Continued)

(58) Field of Classification Search
CPC .......... B64C 29/0008; B64D 2027/026; B64D 27/24; H02J 1/086; H02J 1/12; H02J 7/1423; H02J 7/143; H02J 2310/44
(Continued)

(56) References Cited

U.S. PATENT DOCUMENTS 6,293,491 B1   9/2001  Wobben
8,485,464 B2 * 7/2013  Kroo .................. B64C 3/16
                                                        244/6
(Continued)

FOREIGN PATENT DOCUMENTS

CN    111954622 A    11/2020
EP      3296212 A1     3/2018
(Continued)

OTHER PUBLICATIONS

Written Opinion (PCT/ISA/237) with machine-generated English translation, dated Jul. 14, 2022, by the European Patent Office as the Internal Searching Authority for International Application No. (PCT/FR2022/050014) (12 pages).

*Primary Examiner* — Brady W Frazier
(74) *Attorney, Agent, or Firm* — Boone IP Law (57) ABSTRACT

An aircraft having a hybrid power source includes two horizontal drive units, four vertical drive units, a vertical drive unit comprising a power supply bus the output of which may be connected to a single horizontal drive unit which may be connected to at least two vertical drive units via a switch, two power generation sources connected, on the one hand, to each of the power supply buses by a respective input of the corresponding vertical drive unit and, on the other hand, to each horizontal drive unit via the respective output of each vertical drive unit, and a power supply command arranged to send a power command to the power generation sources according to the power requirements of the vertical drive units and/or horizontal drive (Continued)

units. The power generation sources are also suitable for recharging power sources of the vertical drive units.

11 Claims, 5 Drawing Sheets

(51) Int. Cl.
  *B64D 27/24* (2006.01)
  *H02J 1/08* (2006.01)
  *H02J 1/12* (2006.01)
  *H02J 7/14* (2006.01)
(52) U.S. Cl.
  CPC .............. *H02J 1/12* (2013.01); *H02J 7/1423* (2013.01); *H02J 7/143* (2020.01); *H02J 7/1438* (2013.01); *B64D 27/026* (2024.01); *H02J 2310/44* (2020.01)
(58) Field of Classification Search
  USPC ....................................................... 244/17.23
  See application file for complete search history.

(56) References Cited

U.S. PATENT DOCUMENTS

| | | | |
|---|---|---|---|
| 9,586,690 | B2 | 3/2017 | Rajashekara et al. |
| 10,577,091 | B2* | 3/2020 | Parks ................. B64C 29/0025 |
| 11,066,161 | B2 | 7/2021 | Mermoz et al. |
| 11,312,256 | B2 | 4/2022 | Vinson et al. |
| 2017/0066531 | A1* | 3/2017 | McAdoo ............... B64C 39/024 |
| 2018/0037333 | A1* | 2/2018 | Willford ................. F02C 6/206 |
| 2018/0065739 | A1* | 3/2018 | Vondrell ............. B64C 29/0033 |
| 2020/0079520 | A1* | 3/2020 | Demizu ............ H02J 7/007182 |
| 2020/0148373 | A1* | 5/2020 | Long ........................ F01D 15/10 |
| 2021/0024208 | A1* | 1/2021 | Tao ......................... B64C 3/385 |
| 2021/0078700 | A1* | 3/2021 | Klemen ................. B64D 35/02 |
| 2022/0185489 | A1 | 6/2022 | Thiriet et al. |

FOREIGN PATENT DOCUMENTS

| | | |
|---|---|---|
| EP | 3628593 A1 | 4/2020 |
| FR | 3095806 A1 | 11/2020 |
| WO | 2020016510 A1 | 1/2020 |

* cited by examiner

AIRCRAFT HAVING A HYBRID POWER SOURCE WITH POWER GENERATION SOURCES CONTROLLED ACCORDING TO DRIVE UNIT POWER REQUIREMENTS

The invention relates to the field of aircrafts and more particularly to the field of electrically-propelled vertical take-off and landing aircrafts.

The aeronautical industry is currently experiencing many upheavals, partly related to the evolution of the requirements related to the environment, and partly related to the development of electrically-propelled aircrafts. In particular, the field of VTOLs (standing for Vertical Take-Off and Landing) is particularly dynamic because it offers very interesting prospects as a new means of mobility.

VTOLs, as such, are a quite old field (they were developed as early as 1921), but their electrification has exploded the new solutions offered, as well as the regulations. In particular, the latest regulations (cf. for example SC-VTOL-01 SPECIAL CONDITION Vertical Take-Off and Landing (VTOL) Aircraft; issued on Jul. 2, 2019) require redundancy of all systems related to propulsion and flight, engines, power sources and the entire electrical system to allow ensuring continuity of flight (called "continued safe flight and landing") and not just an emergency landing following the occurrence of a fault. This is also called "one-fail-safe", i.e. "tolerant of a single failure".

These regulations pose many problems, in particular concerning feasibility while maintaining a reasonable cost. Indeed, if all elements are doubled, then the costs are more than doubled because it is necessary to oversize to manage the additional weight, not to mention that this also means reviewing all of the flight capacities of the aircraft thus weighed down.

Hence, other solutions have to be found. Most solutions are based on two principles, possibly used together:
- an extremely sophisticated management of the energy at the battery pack level, with a dedicated module that manages their operating point in detail. The document U.S. Pat. No. 9,586,690 describes this type of solution.
- the use of a power generation source to power the horizontal thrusters, in order to use the batteries only during take-off and landing, which allows increasing the range and the endurance of the electrically-propelled solutions. The document WO 2020/016510 and the document EP 3 628 593 describe this type of solution.

However, these solutions are not fully satisfactory, and in particular do not allow achieving a one-fail-safe solution.

The invention aims to improve the situation. To this end, it provides an aircraft having a hybrid power source comprising at least two horizontal drive thrusters each powered by a respective electric motor, forming at least two respective horizontal drive units, at least four pairs of vertical take-off/landing rotors each powered by a respective electric motor, and at least four power sources each connected to a respective electric motor of a pair of vertical take-off/landing rotors, each pair of rotors forming with the corresponding electric motors and power source a vertical drive unit, each vertical drive unit comprising a power supply bus whose output can be connected to a single horizontal drive unit, the number of vertical drive units being such that each horizontal drive unit can be connected to at least two vertical drive units via a respective switch disposed at the input of the horizontal drive unit, at least two power generation sources, each connected on the one hand to each of the power supply buses by a respective input of the corresponding vertical drive unit, and on the other hand to each horizontal drive unit via the respective output of each vertical drive unit, at least one power supply command arranged to send a power command to the power generation sources according to the power requirements of the vertical drive units and/or of the horizontal drive units, the power sources supplying electricity according to the difference between the power requirements of the vertical drive units and/or of the horizontal drive units and the power emitted by the power generation sources based on the power command, the power generation sources being further suitable for recharging the power sources, such that the power sources are passively controlled.

This aircraft is particularly advantageous because its architecture allows creating redundancy thereby guaranteeing one-fail-safe while optimising the sizing of the elements. Thus, the aircraft according to the invention minimises the additional costs related to the implementation of one-fail-safe and implements a truly hybrid architecture in which the power sources are truly complementary at each step of the flight.

According to various embodiments, the invention may have one or more of the following features:
- the power sources of the vertical drive units are batteries,
- the power generation sources comprise a turbine generator and an AC-DC converter,
- the power generation sources comprise a hydrogen fuel cell and a DC-DC converter,
- the aircraft further comprises electrical contactors connecting each of the horizontal drive units, of the vertical drive units and of the power generation sources to the rest of the electrical circuit of the aircraft,
- each element of each of the horizontal drive units, of the vertical drive units and of the power generation sources is connected to the other elements of the horizontal drive unit, of the vertical drive unit or of the power generation source to which it belongs by an electrical contactor,
- the aircraft further comprises diodes at the input and/or at the output of each of the horizontal drive units, of the vertical drive units and of the power generation sources connecting them to the electrical buses that connect them, and
- the diodes are disposed upstream of the contactors with respect to the power generation sources.

Other features and advantages of the invention will appear better upon reading the following description, taken from examples given for illustrative and non-limiting purposes, taken from the drawings wherein.

The drawings and the description hereinafter essentially contain certain elements. Hence, they could not only be used to better understand the present invention, but also contribute to definition thereof, where necessary.

The present description could involve elements susceptible to protection by author's rights and/or copyright. The rights holder has no objection to the identical reproduction by anyone of this patent document or its description, as it appears in the official files. For the rest, he fully reserves his rights.

Figure 1:
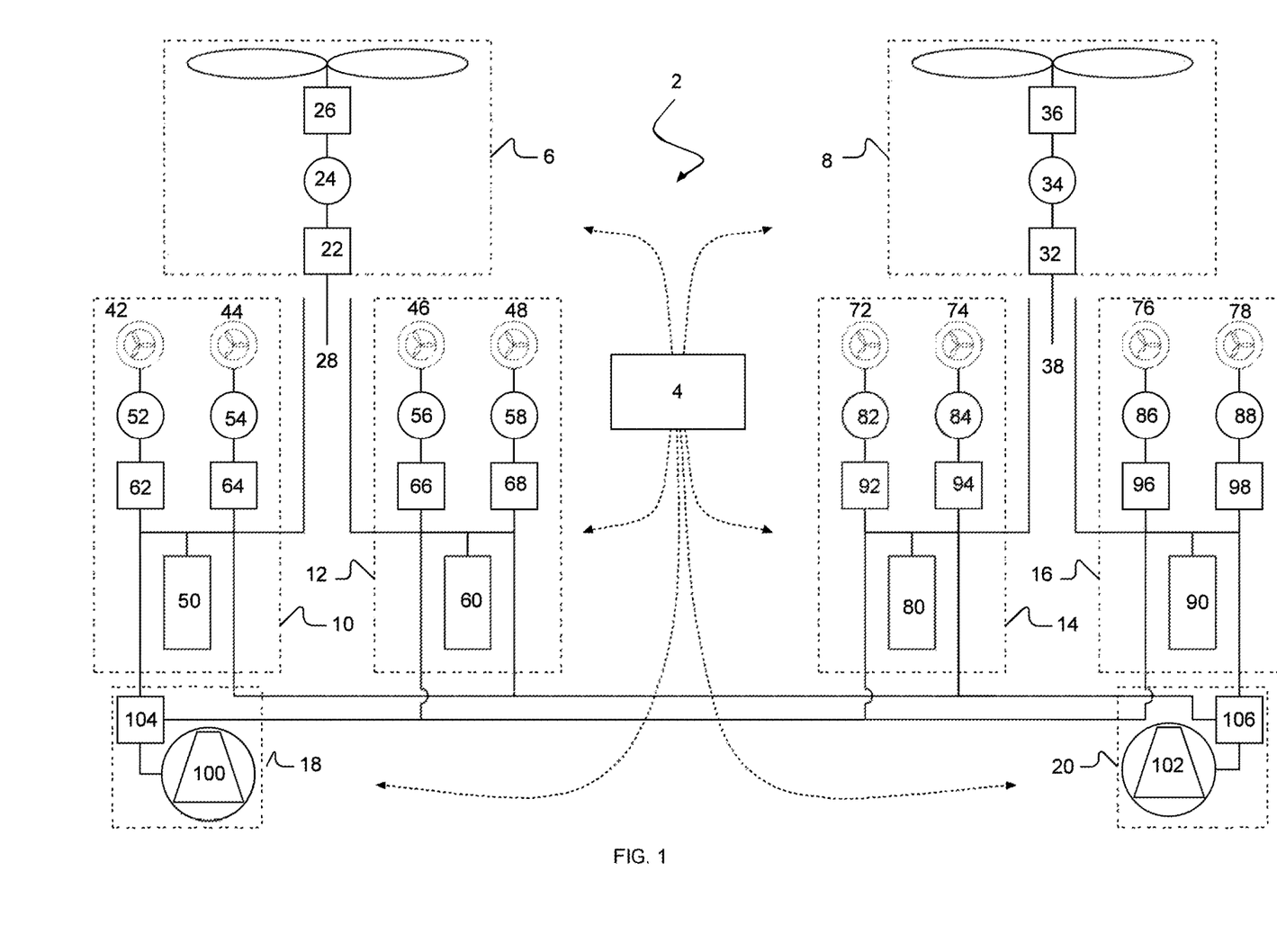
FIG. 1 represents a schematic view of the electrical architecture of an aircraft according to the invention.

As shown in FIG. 1, an aircraft 2 according to the invention comprises a command 4, two horizontal drive units 6 and 8, four vertical drive units 10, 12, 14 and 16, and two power generation sources 18 and 20.

In the example described herein, the horizontal drive unit 6 (respectively 8) comprises a DC-AC converter 22 (respectively 32), an electric motor 24 (respectively 34) and a thruster 26 (respectively 36), for example with a propeller. The thruster 26 (respectively 36) is arranged to enable the aircraft to move forwards in a substantially horizontal direction. In the example described herein, the thruster 26 (respectively 36) consumes a power of 80 kW in flight mode.

The horizontal drive unit 6 (respectively 8) is connected at the input to a switch 28 (respectively 38) which allows connecting this input to the output of the vertical drive unit 10 (respectively 14) or 12 (respectively 16), as described hereinbelow.

The vertical drive unit 10 (respectively 12, 14, 16) comprises a rotor 42 (respectively 46, 72, 76) driven by a motor 52 (respectively 56, 82, 86), a rotor 44 (respectively 48, 74, 78) driven by a motor 54 (respectively 58, 84, 88). The motors 52 and 54 are powered by a respective DC-AC converter 62 and 64 (respectively 66 and 68, 92 and 94, 96 and 98). The DC-AC converters 62 and 64 (respectively 66 and 68, 92 and 94, 96 and 98) are connected to an electrical bus of the vertical drive unit 10 (respectively 12, 14, 16), to which is connected a battery 50 (respectively 60, 80, 90) as well as an input connected to an electrical distribution bus of the power generation source 18, an input connected to an electrical distribution bus of the power generation source 20. Finally, the electrical bus of each of the vertical drive units 10 and 12 (respectively 14 and 16) is connected to a respective output of these, which is connected to the switch 28 (respectively 38). As will be seen hereinbelow, the batteries 50, 60, 80 and 90 together output 600 kW when they output 100% of their capacity.

In the example described herein, each power generation source 18 (respectively 20) comprises on the one hand a turbine generator 100 (respectively 102) and an AC-DC converter 104 (respectively 106). In the example described herein, each turbine generator can output 40 kW at 100% of its capacity. Alternatively, the power generation sources could be other DC or AC power generation sources, followed by an AC-DC converter or a DC-DC converter. Thus, these sources could be based on turbogenerators powered by conventional fuel, biofuel, or synthetic fuels. Still alternatively, a hydrogen-based energy source, such as a fuel cell, could be used.

As will be seen hereinbelow, the command 4 is a low-voltage apparatus arranged to control on the one hand the power generation sources 18 and 20, on the other hand the switches 28 and 38, as well as various protection elements which are not represented in FIG. 1 and which will be explained further with FIGS. 2 to 6.

When analysing FIG. 1, it appears that all motor and electrical elements are duplicated. Thus, one-fail-safe can be ensured as will be described later on. Indeed, there are two horizontal drive units, four vertical drive units themselves forming two sub-groups connected to the same horizontal drive unit, and two power generation sources.

Yet beyond this quite conventional duplication, it is the electrical buses specific to each vertical drive unit, as well as the electrical distribution bus specific to each power generation source that, together, allow achieving the benefits of the invention.

Indeed, as will be seen hereinbelow, the particular structure of the aircraft of FIG. 1 allows having a true hybridisation of the electric power sources, in contrast with the existing solutions in which it consists of a juxtaposition. Thus, depending on the power requirements, both the batteries and the power generation sources can operate in conjunction. Yet beyond that, this architecture allows treating the batteries as mere "energy buffers". The batteries are treated in a completely passive manner, with no need for software or hardware intelligence other than the basic intelligence required to make the battery system itself BMS (Battery Management System) operate, for example to activate the protections and report the status. This goes completely against all existing solutions, wherein either an element is specifically intended to optimise the operation of the batteries, and acts as a command, or an element is intended to compensate for a possible weakness of the batteries, but in an exclusive alternation, i.e. without the batteries and this element being able to operate simultaneously.

Figure 2:
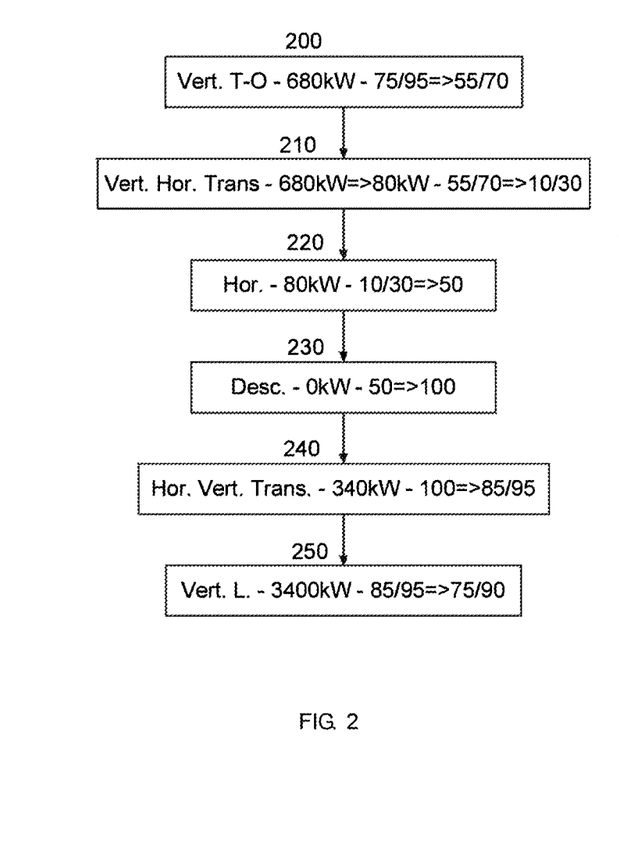
FIG. 2 represents an example of a flight sequence indicating which elements are active in which phase and what are the associated electrical charge levels.

FIG. 2 represents an energy consumption cycle during a flight with an aircraft of FIG. 1. As shown in this figure, the flight begins with a first operation 200 in which the aircraft takes off vertically. In this phase, the rotors of the vertical drive units operate and form the major part of the consumed energy—the horizontal drive units are likely to operate for stability reasons, but with a negligible energy consumption. They are powered up to 600 kW by the batteries and up to 80 kW by the power generation sources. Thus, the batteries, filled between 75% and 90% at the beginning of the flight, transitions to 55% to 70% of their capacity. At the end of this phase, the aircraft is about 50 feet from its take-off point, i.e. about 15 m of altitude difference.

Afterwards, in an operation 210, the aircraft progressively transitions from vertical flight to horizontal flight between 50 feet and 150 feet, and then the aircraft carries out a climb similar to that of conventional aircraft. In this phase, the rotors are progressively stopped, and the consumption drops from 680 kW to 80 kW once horizontal cruise has been reached. The batteries and the power generation sources continue to work at full rate, and the batteries continue to drain, down to 10% to 30% when the horizontal cruise phase is reached.

The horizontal flight is performed in an operation 220 during which the batteries are not used. The power generation sources continue to run at full rate and the 80 kW they produce are shared between the horizontal drive units which are controlled by the command, and the power not consumed by these is used to recharge the batteries. This phase, at an altitude of more than 1000 feet (about 300 m), allows recharging the batteries to about 50%.

Afterwards, the descent takes place in an operation 230, in which the power generation sources are used at 100% to recharge the batteries. This allows recharging the batteries to 100%. In this phase, no motor element consumes energy.

Afterwards, the transition from horizontal to vertical flight is carried out in an operation 240, in which the consumption progressively transitions to about 340 kW, and in which the charge of the batteries progressively transitions from 100% to between 85% and 95%.

Finally, in an operation 250, the vertical landing is carried out by applying only the rotors, like for the take-off, but with the advantage of taking advantage of gravity. Thus, the batteries continue to discharge up to between 75% and 90%, like at the starting point of the operation 200.

Hence, it arises that the aircraft does not need to be recharged on the ground between two flights, which increases its usability. In addition, it plainly appears that the power generation sources always operate at full capacity (there is an exceptional case which will appear with FIG. 6), and that the batteries serve to compensate for the cases where the power generation sources cannot supply enough power. Similarly, as soon as possible, the batteries are recharged as much as possible in order to guarantee having enough electrical energy to land.

Alternatively, the batteries of the aircraft may be recharged on the ground between two flights sufficiently separated over time. In this case, the command 4 may carry out more sophisticated trade-offs on the power supply during the various phases, either to increase the operating points of the turbine generators to modify the distribution of the energy supply and increase the range, limit noise pollution, pollutant emissions, etc.

The control of the batteries is managed in a passive manner thanks to the architecture of the invention—if the rotors or the horizontal drive units draw less than 80 kW, then the batteries are naturally not used, and the excess current could even be used to recharge them (like in the operation 220 or 230); if more power is requested, then the batteries are naturally used.

It also arises that the oversizing of the batteries could be kept quite low thanks to the architecture of the invention. Indeed, it is no coincidence that between 10% and 30% of the charge remains in the batteries at the end of the operation 220—this guarantees being able to hold the one-fail-safe with a failure eliminating a battery.

Figure 3:
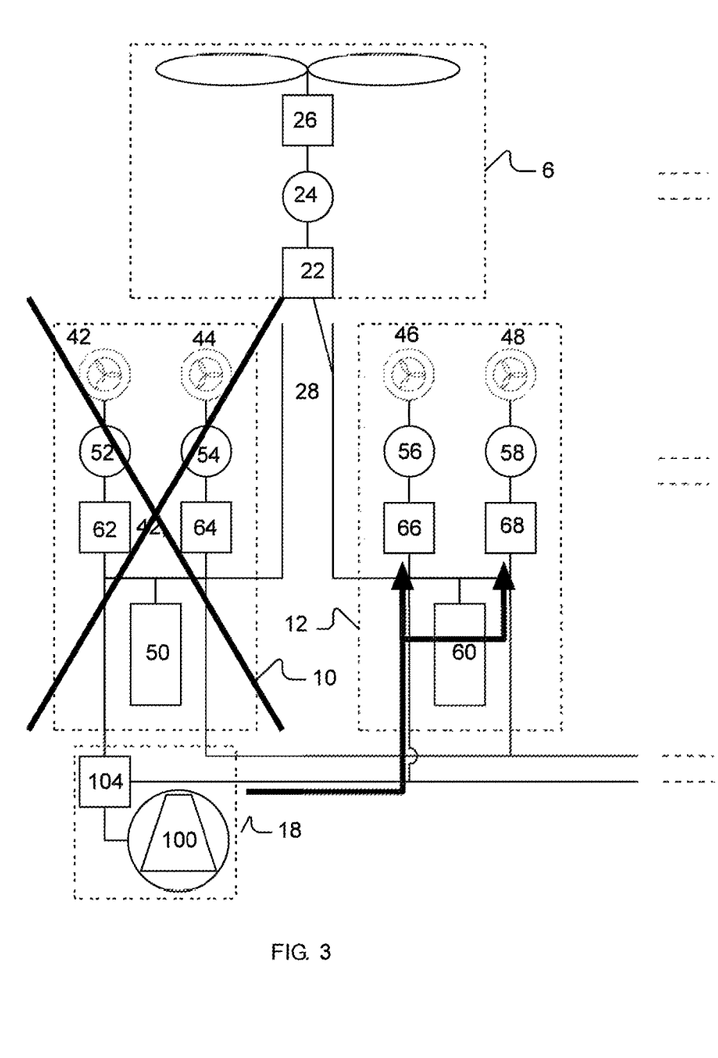
FIG. 3 represents an example of configuration in the event of loss of a vertical drive unit during take-off or landing.

FIG. 3 represents a case of failure of a battery or of another electrical element of one of the vertical drive units. For simplicity, only the energy coming out of the power generation source 18 and the vertical drive unit 12 are represented, but the other elements operate similarly.

In the represented case, the first vertical drive unit 10 is switched off due to an electrical failure of one of the motors 52 or 54. This is particularly disabling during one of the operations 200, 210, 240 or 250.

First of all, it should be noted that each electrical element is protected by a contactor which may be controlled to isolate it from the rest of the circuit. Thus, in this embodiment, two contactors, which are not represented, at the inputs connected to the electrical distribution buses specific to each generation source allow isolating the vertical drive unit 10 (respectively 12, 14, 16) and avoiding any propagation of an electrical problem from the outside towards the vertical drive unit 10 (respectively 12, 14, 16). This is also the case for the horizontal drive units with the switches 28 and 38 as well as with the power generation sources with switches which are not represented. In addition, each element inside these electrical subsets is also connected to the rest of the electrical subset to which it belongs by means of a switch which is not represented, so that, if for example the battery 50 malfunctions, it could be cut off from the rest of the vertical drive unit 10 without immediately disconnecting the latter.

In the example described herein, the contactors are doubled by the presence of diodes (not represented) which, in the event of an electrical problem and in particular a short-circuit, allow isolating the vertical drive unit in a passive manner to prevent any propagation of an electrical problem from the vertical drive unit 10 (respectively 12, 14, 16) to the outside.

In addition, the batteries 50, 60, 80 and 90 are oversized. Simultaneously, the command 4 ensures that the switch 28 connects to the output of the vertical drive unit 12. Hence, the batteries are then used up to 100 kW. In addition, the power generation sources may be used beyond their conventional operating point and be used at 110% or 120% for a few minutes. This, together with the overuse of the batteries, allows compensating for the loss of 80 kW related to the disconnection of the vertical drive unit 10. The path followed by the electricity coming out of the power generation source 18 is represented by bold arrows.

Thus, the take-off (or an emergency landing) are guaranteed and can be carried out without any risk, with a slight oversizing of the batteries.

Figure 4:
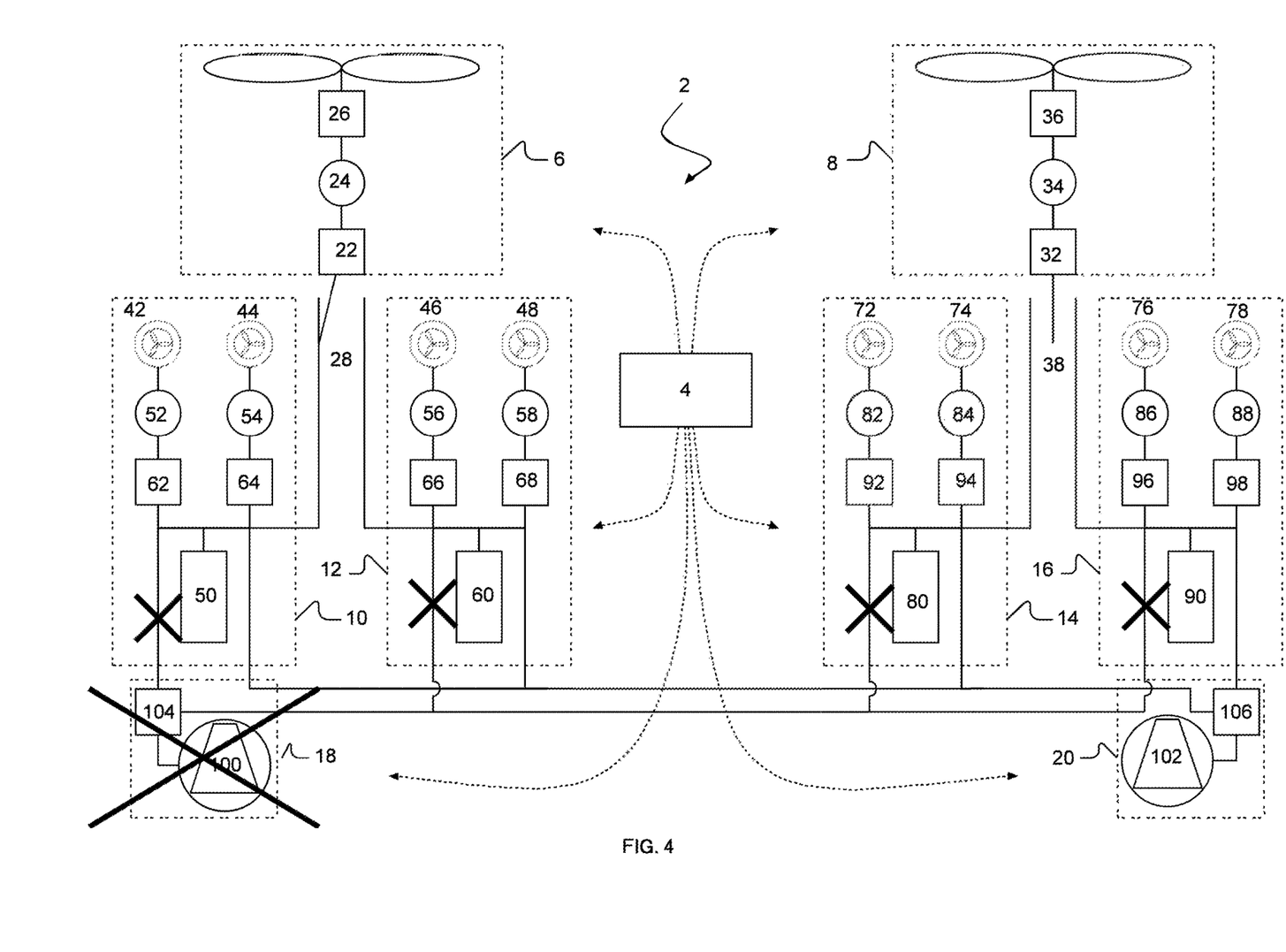
FIG. 4 represents an example of configuration in the event of loss of an power generation source.

FIG. 4 represents a different failure case in which one of the power generation sources is lost. Herein again, only some power elements are represented, but the others operate similarly.

As shown in this figure, the inputs of the vertical drive units connected to the electrical distribution bus of the power generation source 10 are isolated thanks to contactors opened by the command 4. In addition, the remaining power generation source is used beyond its conventional operating point, and batteries are involved to maintain a power supply in the range of 70 kW i.e. 90% of the power normally consumed by the horizontal drive units.

Herein again, the one-fail-safe is guaranteed, since the batteries could be recharged in the descent phase before landing. In addition, the 25% oversizing of the batteries guarantees having enough energy to continue the horizontal flight at 90% of normal capacities.

Figure 5:
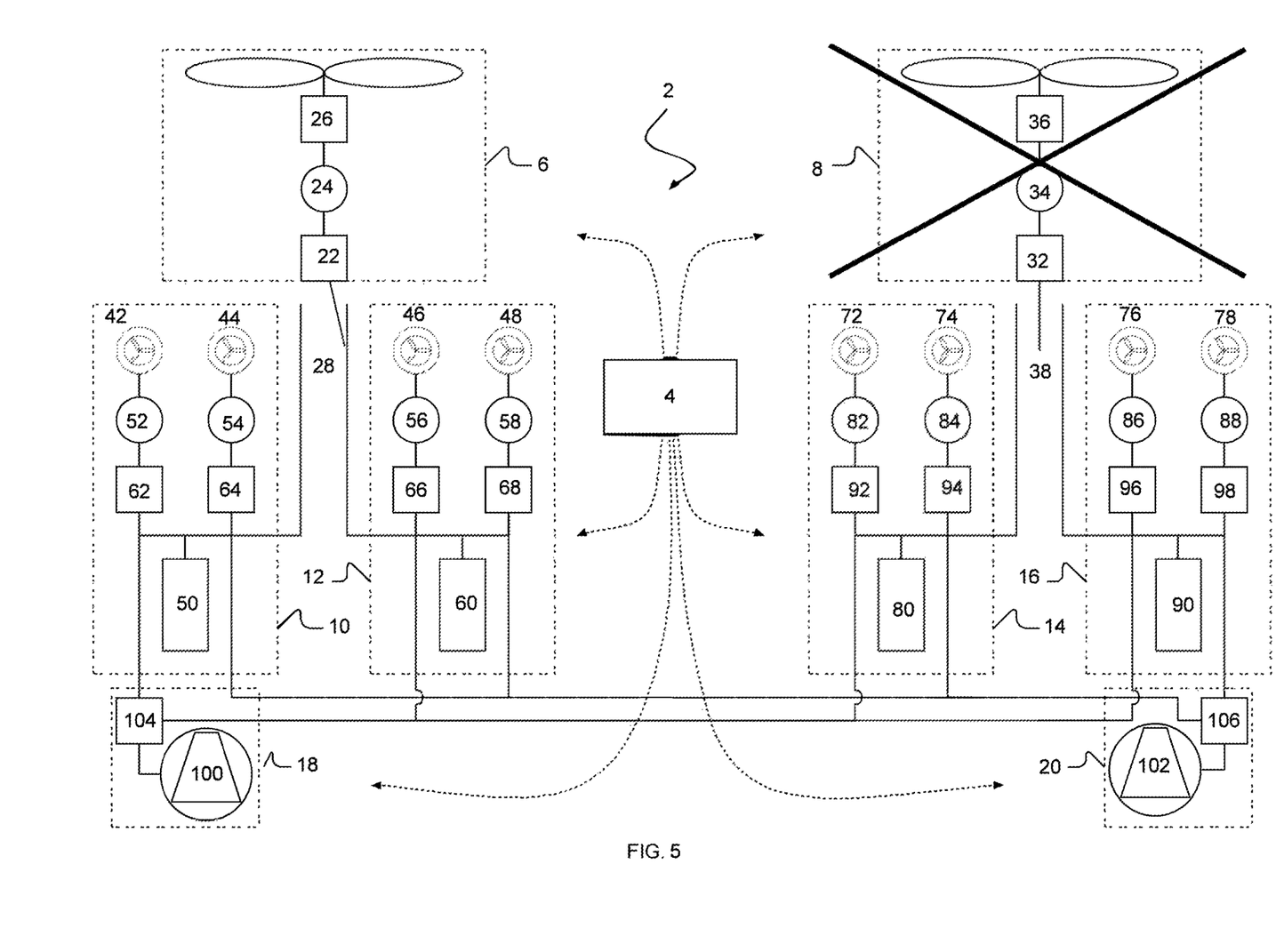
FIG. 5 represents an example of configuration in the event of loss of a horizontal drive unit.

FIG. 5 shows yet another different failure case in which this time it is a horizontal drive unit that is lost. In this case, the remaining horizontal drive unit is used to the maximum of its capacities in order to keep a horizontal cruise having an altitude and speed profile taking into account the loss. The batteries may be used as a buffer in case of sudden overconsumption.

Figure 6:
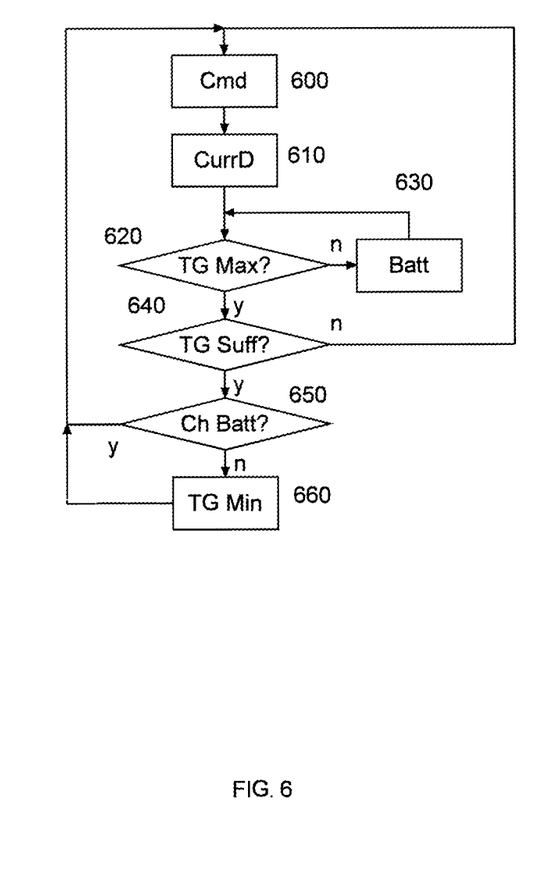
FIG. 6 represents an example of a power control management algorithm implemented by the aircraft.

FIG. 6 shows an algorithm that may be implemented by the command 4 to manage the power command according to the various situations.

This consists of a cycle that starts in an operation 600 of receiving an operating point for the rotors and/or the thrusters.

Afterwards, in an operation 610, the rotors and/or thrusters draw a current corresponding to this operating point. This operation is followed by a test in an operation 620 to determine whether the turbine generator is controlled at 100% or not. If so is not the case, then command 4 pushes it at full, and as it increase speed, the batteries compensate for the current requirement in an operation 630. If the turbine generator is pushed at full, then in an operation 640, the command 4 determines whether its production is enough for the current draw of the operation 610. If so is not the case, then the full load is kept until the next operating point, and the batteries are loaded. If so is the case, then in an operation 650, the command 4 verifies whether the batteries need to be charged. If so is the case, then the full load is maintained and the excess power is used to charge the batteries until the next operating point. Otherwise, then the command 4 reduces the operating point of the turbine generator in an operation 660, until the next operating point.

In the foregoing, the power consumptions have been given merely for indicative and non-limiting purposes. The electrical architecture should be adapted according to the actual needs related to the flights of the aircraft.

It arises from the foregoing that the power sources are of the high power/low capacity type, whereas the power generation sources are of the high capacity/low power type. This results from the fact that the power sources are used as energy buffers and that the power generation sources are sized with regards to the consumptions of the horizontal flight and to allow recharging the energy buffers.

This duality, implemented thanks to the above-described architecture according to which all electrical circuits are interconnected while being made independent by protections, allows creating redundancy guaranteeing one-fail-safe while optimising the sizing of the elements. Thus, the aircraft according to the invention minimises the additional costs related to the implementation of one-fail-safe and implements a truly hybrid architecture in which the power sources are truly complementary at each step of the flight.

It should also be noted that the figures represent electrical diagrams of the aircraft. Thus, despite the fact that the rotors 42 and 44, 46 and 48, 52 and 54, 56 and 58 are represented side-by-side, this would not necessarily be the case from a mechanical perspective. Indeed, the rotors are assembled in pairs in a vertical drive unit so that a failure does not result in a destabilisation of the aircraft. Hence, the rotors of the same vertical drive unit will generally be disposed symmetrically with respect to the centre of the aircraft.

In addition, although the figures represent an aircraft with 2 thrusters, 8 rotors and 2 turbine generators, their number may be different. Indeed, there may be more than 2 thrusters, and there may be more than two vertical drive units per horizontal drive unit. Similarly, the command 4 may also be doubled in order to ensure an additional degree of resilience.

Finally, the fact that a given vertical drive unit can be connected only to one horizontal drive unit allows simplifying the control of the architecture. Indeed, this principle allows controlling the redundancy and sizing by the number of different vertical drive units connected to the same horizontal drive unit. And the resilience is organised by the switches of the horizontal drive units, which may be achieved in a simple way. This is much more efficient than in a scheme wherein a vertical drive unit could be connected to several horizontal drive units, which would pose major control problems, both in the steady mode and in the degraded mode.

Alternatively, as suggested hereinabove, the aircraft could be charged on the ground, so that the power sources are 100% full on take-off. This then allows implementing other flight schemes, by increasing the range of the aircraft, as well as limiting noise emissions and pollutant emissions during the take-off and landing phases at low altitude.

The invention claimed is:

1. An aircraft having a hybrid power source comprising:
at least two horizontal drive thrusters each powered by a respective first electric motor, forming at least two respective horizontal drive units,
at least four pairs of vertical take-off/landing rotors, each of the vertical take-off/landing rotors powered by a respective second electric motor, and at least four power sources each connected to a respective pair of the second electric motors of a respective one of the pairs of vertical take-off/landing rotors, each pair of rotors forming with the respective second electric motors and power source a vertical drive unit, each vertical drive unit comprising a power supply bus whose output can be connected to a single one of the horizontal drive units, the number of vertical drive units being such that each horizontal drive unit is connectable to at least two of the vertical drive units via a respective switch disposed at an input of the horizontal drive unit,
at least two power generation sources, each connected on the one hand to each of the power supply buses by a respective input of the corresponding vertical drive unit, and on the other hand to each horizontal drive unit via the respective output of each vertical drive unit,
at least one power supply controller configured to send a power command to the power generation sources:
  (i) according to power requirements of the vertical drive units and of the horizontal drive units, the power sources supplying electricity according to a difference between the power requirements of the vertical drive units and of the horizontal drive units and power emitted by the power generation sources based on the power command; or
  (ii) according to power requirements of the vertical drive units, the power sources supplying electricity according to a difference between the power requirements of the vertical drive units and the power emitted by the power generation sources based on the power command; or
  (iii) according to power requirements of the horizontal drive units, the power sources supplying electricity according to a difference between the power requirements of the horizontal drive units and the power emitted by the power generation sources based on the power command,
the power generation sources being further configured for recharging the power sources, such that the power sources are passively charged.

2. The aircraft according to claim 1, wherein the power sources of the vertical drive units are batteries.

3. The aircraft according to claim 1, wherein the power generation sources comprise a turbine generator and an AC-DC converter.

4. The aircraft according to claim 1, wherein the power generation sources comprise a hydrogen fuel cell and a DC-DC converter.

5. The aircraft according to claim 1, further comprising electrical contacts connecting each of the horizontal drive units, of the vertical drive units and of the power generation sources to a rest of an electrical circuit of the aircraft.

6. The aircraft according to claim 5, wherein each element of the horizontal drive units, the vertical drive units and the power generation sources is connected by a respective one of the electrical contacts.

7. The aircraft according to claim 1, further comprising diodes electrically connected to each of the horizontal drive units, of the vertical drive units and of the power generation sources connecting each of the horizontal drive units, of the vertical drive units, and of the power generation sources, to the power supply buses that connect them.

8. The aircraft according to claim 5, further comprising diodes electrically connected to each of the horizontal drive units, of the vertical drive units and of the power generation sources connecting each of the horizontal drive units, of the vertical drive units, and of the power generation sources, to the power supply buses that connect them, wherein the diodes are disposed upstream of the contacts with respect to the power generation sources.

9. The aircraft according to claim 6, further comprising diodes electrically connected to each of the horizontal drive units, of the vertical drive units and of the power generation sources connecting each of the horizontal drive units, of the vertical drive units, and of the power generation sources, to the power supply buses that connect them, wherein the diodes are disposed upstream of the contacts with respect to the power generation sources.

10. The aircraft according to claim 2, wherein the power generation sources comprise a turbine generator and an AC-DC converter.

11. The aircraft according to claim 2, wherein the power generation sources comprise a hydrogen fuel cell and a DC-DC converter.

\* \* \* \* \*